US012669631B2

(12) United States Patent
Han et al.

(10) Patent No.: US 12,669,631 B2
(45) Date of Patent: Jun. 30, 2026

(54) INTEGRATIVE WORKFLOW OF CONSTRUCTING MECHANICAL EARTH MODEL (MEM) FOR WELLBORE DRILLING

(71) Applicant: ARAMCO SERVICES COMPANY, Houston, TX (US)

(72) Inventors: Yanhui Han, Houston, TX (US); Khaqan Khan, Dhahran (SA); Rima Taqi AlFaraj, Al Qatif (SA); Dung T. Phan, Brookshire, TX (US); Chao Liu, Brookshire, TX (US); Khalid M. Alruwaili, Dammam (SA); Murtadha J. AlTammar, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 483 days.

(21) Appl. No.: 18/326,986

(22) Filed: May 31, 2023

(65) Prior Publication Data

US 2024/0402384 A1 Dec. 5, 2024

(51) Int. Cl.
*G01V 20/00* (2024.01)
*E21B 49/00* (2006.01)

(52) U.S. Cl.
CPC ............ *G01V 20/00* (2024.01); *E21B 49/005* (2013.01); *E21B 2200/20* (2020.05)

(58) Field of Classification Search
CPC ... G01V 20/00; E21B 49/005; E21B 2200/20; E21B 49/00
See application file for complete search history.

(56) References Cited

U.S. PATENT DOCUMENTS

2008/0319675 A1 12/2008 Sayers
2013/0289962 A1 10/2013 Wendt et al.
(Continued)

OTHER PUBLICATIONS

M. Afsari et al., "Using Drilling and Logging Data for Developing 1D Mechanical Earth Model for a Mature Oil Field to Predict and Mitigate Wellbore Stability Challenges", 2010, In International Oil and Gas Conference and Exhibition in China, Society of Petroleum Engineers, SE 132187, pp. 1-12 (12 pages).
(Continued)

*Primary Examiner* — Mi'schita' Henson
(74) *Attorney, Agent, or Firm* — Osha Bergman Watanabe & Burton LLP

(57) ABSTRACT

A method of constructing a mechanical earth model (MEM) includes integrating a density logging data set to compute vertical stress and applying correlation models or equations to estimate a pore pressure and mechanical properties. The method also includes calibrating the pore pressure with drill stem test data, calibrating the mechanical properties with laboratory tests on core plugs or on rock cuttings, estimating a minimum horizontal stress using correlation models, and calibrating the minimum horizontal stress with minifrac tests. The method further includes estimating a maximum horizontal stress using the correlation models while assuming one or more correlation parameters, calibrating the maximum horizontal stress with a global pattern of tectonic strains and a basin stress regime, evaluating one or more breakout regions using the MEM, a trajectory of a well, and a geometry of a pilot hole, and comparing the one or more breakout regions and a caliper logging data set.

20 Claims, 9 Drawing Sheets

(56) References Cited

U.S. PATENT DOCUMENTS

| | | |
|---|---|---|
| 2016/0349389 A1 | 12/2016 | Walters et al. |
| 2020/0103549 A1 | 4/2020 | Oppert et al. |
| 2021/0254458 A1 | 8/2021 | Walters et al. |
| 2022/0236446 A1* | 7/2022 | Han .................... E21B 49/006 |
| 2022/0259960 A1* | 8/2022 | Xia ........................ G01V 20/00 |
| 2022/0291418 A1 | 9/2022 | Noufal |
| 2023/0003118 A1* | 1/2023 | AlTammar .............. E21B 44/00 |

OTHER PUBLICATIONS

A. H. A. Ali et al., "Watching Rocks Change-Mechanical Earth Modeling", 2003, In Oilfield Review 15., pp. 22-38 (18 pages).
C. A. Barton et al., "In?situ stress orientation and magnitude at the Fenton Geothermal Site, New Mexico, determined from wellbore breakouts", May 1988, Geophysical Research Letters, vol. 15, No. 5, pp. 467-470 (4 pages).
G. Bowers, "Pore pressure estimation from velocity data: Accounting for overpressure mechanisms besides undercompaction", 1995, SPE Drilling & Completion, vol. 10, No. 02, pp. 89-95 (7 pages).
B. A. Eaton, "The equation for geopressure prediction from well logs", 1975, In Fall meeting of the Society of Petroleum Engineers of AIME. Society of Petroleum Engineers, pp. 1-11 (11 pages).
J. Forrest et al., "Geothermal gradients and subsurface temperatures in the northern Gulf of Mexico", 2005, Gulf Coast Association of Geological Societies Transactions vol. 55, pp. 233-248 (15 pages).
Q. Li et al., H., 2020. "A Correlation for Estimating the Biot Coefficient", 2020, SPE Drilling & Completion, vol. 35, No. 02, pp. 151-163 (13 pages).
R. Plumb et al., "The Mechanical Earth Model Concept and Its Application to High-Risk Well Construction Projects", 2000, IADC/ SPE Drilling Conference (13 pages).
M. J. Thiercelin et al., "Thiercelin, M.J. and Plumb, R.A., 1994. Core-based prediction of lithologic stress contrasts in east Texas formations", 1994, SPE Formation Evaluation, vol. 9, No. 04, pp. 251-258 (8 pages).

N. R. Warpinski, "Elastic and viscoelastic calculations of stresses in sedimentary basins", 1989, SPE Formation Evaluation, vol. 4, No. 04, pp. 522-530 (9 pages).
G. Xi et al., "Mud Weight Optimization to Reduce Non-Productive-Time While Drilling Through Shale/Carbonate Sequence of UAE: A Case Study", 2015, In Abu Dhabi International Petroleum Exhibition and Conference. Society of Petroleum Engineers, SPE-177851-MS (10 pages).
J. Zhang, "Effective stress, porosity, velocity and abnormal pore pressure prediction accounting for compaction disequilibrium and unloading" 2013, Marine and Petroleum Geology, vol. 45, pp. 2-11 (10 pages).
Y. Han 2021. "Refined equations for estimating maximum horizontal stress from borehole breakouts in vertical wells", 2021, Geomechanics and Geophysics for Geo-Energy and Geo-Resources, vol. 7, No. 2, pp. 1-12 (12 pages).
Abdelghany, W. et al., "Geomechanical modeling using the depth-of-damage aproach to achieve successful underbalanced drilling in the Gulf of Suez rift basin," Journal of Petroleum Science and Engineering, vol. 202, No. 108311, pp. 1-4, Dec. 28, 2020 (4 pages).
Kosset, T. et al., "Wellbore Integrity Analysis for Wellpath Optimization and Drilling Risks Reduction: The Vaca Muerta Formation in Neuque N Basin," retrieved from https://repository.mines.edu/ server/api/core/bitstream/ce0b937e-b063-4477-bd48-0b48123ad12b/ content, Jan. 1, 2014 (66 pages).
Gholami, R. et al., "A Methodology for Wellbore Stability Analysis of Drilling into Presalt Formations: A Case Study from Southern Iran," Journal of Petroleum Science and Engineering, vol. 167, pp. 249-261, Aug. 1, 2018 (28 pages).
International Search Report issued in corresponding International Application No. PCT/US2024/031112; mailed Aug. 30, 2024 (6 pages).
Written Opinion of the International Searching Authority issued in corresponding International Application No. PCT/US2024/031112; dated Aug. 30, 2024 (7 pages).

* cited by examiner

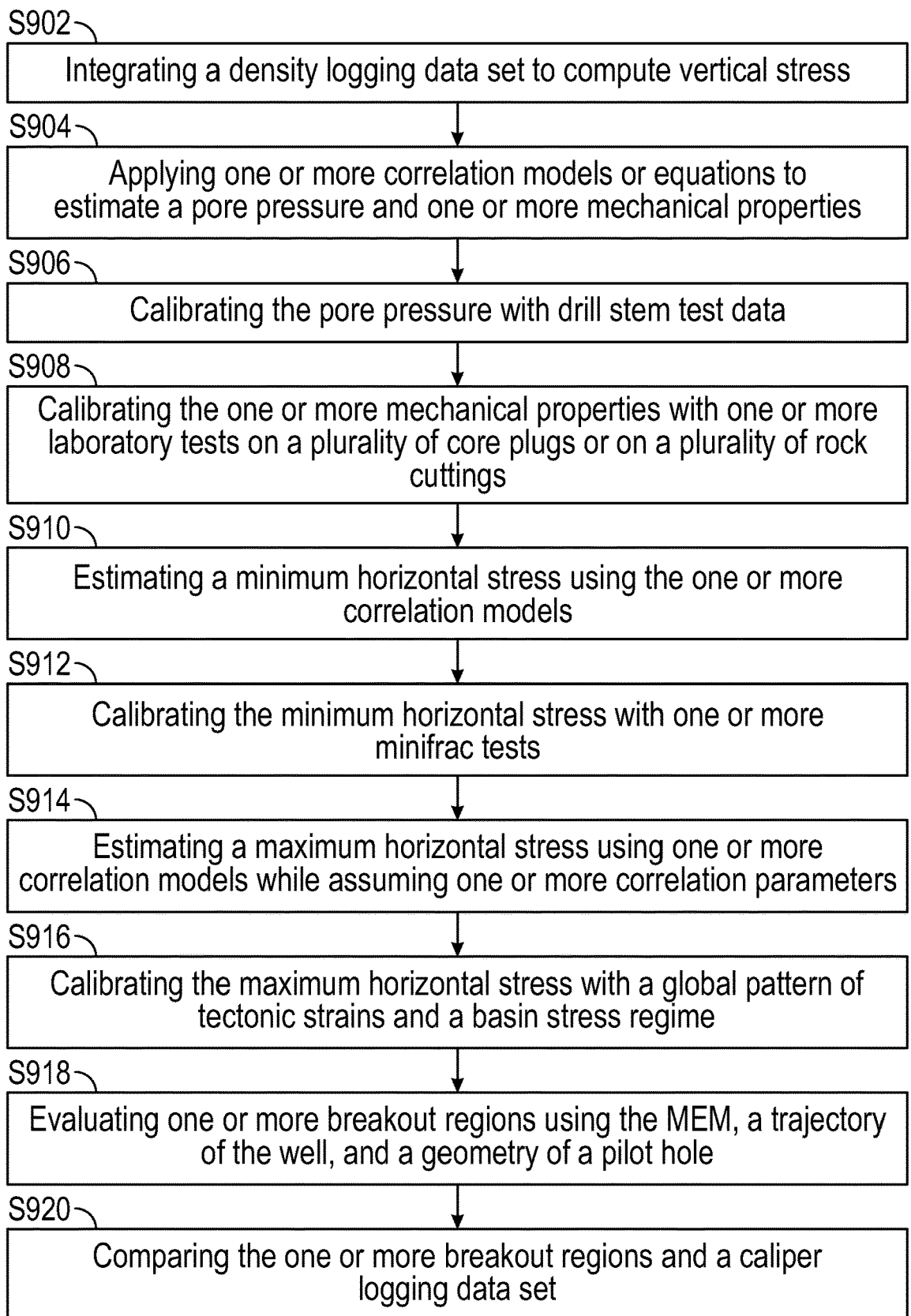

S902

Integrating a density logging data set to compute vertical stress

S904

Applying one or more correlation models or equations to estimate a pore pressure and one or more mechanical properties

S906

Calibrating the pore pressure with drill stem test data

S908

Calibrating the one or more mechanical properties with one or more laboratory tests on a plurality of core plugs or on a plurality of rock cuttings

S910

Estimating a minimum horizontal stress using the one or more correlation models

S912

Calibrating the minimum horizontal stress with one or more minifrac tests

S914

Estimating a maximum horizontal stress using one or more correlation models while assuming one or more correlation parameters

S916

Calibrating the maximum horizontal stress with a global pattern of tectonic strains and a basin stress regime

S918

Evaluating one or more breakout regions using the MEM, a trajectory of the well, and a geometry of a pilot hole

S920

Comparing the one or more breakout regions and a caliper logging data set

FIG. 9

INTEGRATIVE WORKFLOW OF CONSTRUCTING MECHANICAL EARTH MODEL (MEM) FOR WELLBORE DRILLING

BACKGROUND

A mechanical earth model (MEM) is a numerical representation of in-situ conditions (i.e., the original state of stresses, pore pressure, temperature) and mechanical properties of rock formations for a specific stratigraphie section in a field or basin. In-situ conditions and mechanical properties are necessary inputs for all geomechanics related analysis at various stages in oil & gas exploration and production, such as wellbore stability, sand control, hydraulic fracturing, reservoir compaction.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method of constructing a mechanical earth model (MEM). The method may include integrating a density logging data set to compute vertical stress, applying one or more correlation models or equations to estimate a pore pressure and one or more mechanical properties, calibrating the pore pressure with drill stem test data, and calibrating the one or more mechanical properties with one or more laboratory tests on a plurality of core plugs or on a plurality of rock cuttings. The method may also include estimating a minimum horizontal stress using one or more correlation models, calibrating the minimum horizontal stress with one or more minifrac tests, estimating a maximum horizontal stress using the one or more correlation models while assuming one or more correlation parameters, and calibrating the maximum horizontal stress with a global pattern of tectonic strains and a basin stress regime. The method may further include evaluating one or more breakout regions using the MEM, a trajectory of a well, and a geometry of a pilot hole, and comparing the one or more breakout regions and a caliper logging data set.

In another aspect, embodiments disclosed herein relate to a well testing system. The system may include a pilot hole extending from a surface location to a formation, a well logging assembly disposed in the pilot hole and configured to perform density logging, performing sonic logging, and performing caliper logging, and a mechanical earth model (MEM) development system coupled to the well logging assembly and positioned at the surface location. The MEM development system may be configured to integrate a density logging data set to compute vertical stress, apply one or more correlation models or equations to estimate a pore pressure and one or more mechanical properties, calibrate the pore pressure with drill stem test data, and calibrate the one or more mechanical properties with one or more laboratory tests on a plurality of core plugs or on a plurality of rock cuttings. The MEM development system may also be configured to estimate a minimum horizontal stress using the one or more correlation models, calibrate the minimum horizontal stress with one or more minifrac tests, estimate a maximum horizontal stress using the one or more correlation models while assuming one or more correlation parameters. The MEM development system may further be configured to evaluate one or more breakout regions using the MEM, a trajectory of a well, and a geometry of a pilot hole, and compare the one or more breakout regions and a caliper logging data set.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The size and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

FIG. 9 shows a flowchart of a method in accordance with one or more embodiments.

DETAILED DESCRIPTION

Figure 1:
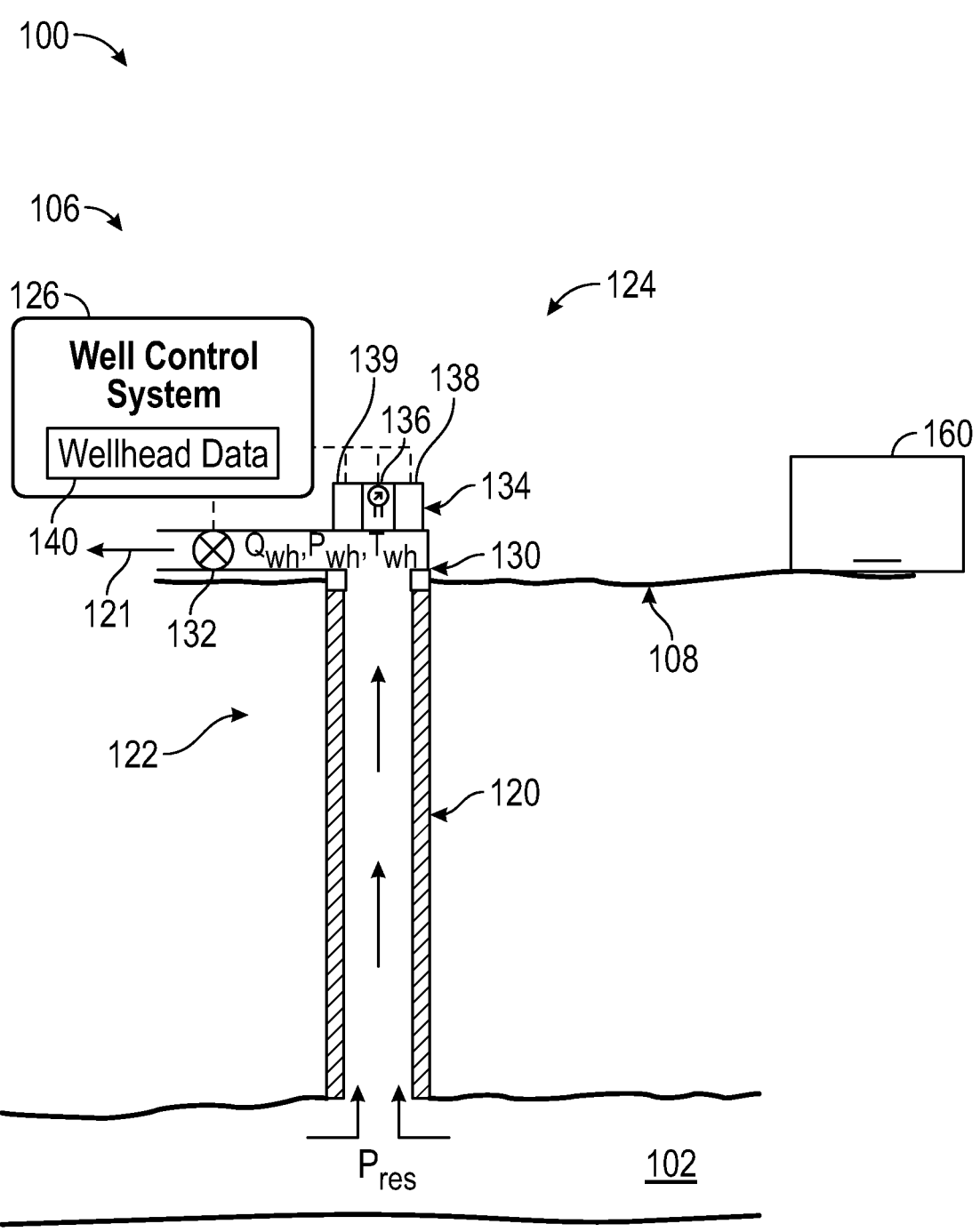
FIG. 1 shows a system in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-9, any component described with regard to a figure, in various embodiments disclosed herein, may be equivalent to one or more like-named components described with regard to any other figure. For brevity, descriptions of these components may not be repeated for each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a seismic data set" includes reference to one or more of such seismic data set.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

In one aspect, embodiments disclosed herein relate to a process for constructing a mechanical earth model (MEM) by integrating well logging based correlation, geological stress regime information, breakout observation in a pilot hole, and rock mechanics laboratory tests. In another aspect, embodiments disclosed herein relate to a process for constructing a MEM by applying empirical correlation equations to well logging data to estimate vertical and horizontal stresses, pore pressure, and rock mechanical properties.

FIG. 1 shows a schematic diagram in accordance with one or more embodiments. FIG. 1 illustrates a well environment (100) that includes a hydrocarbon reservoir ("reservoir") (102) located in a subsurface hydrocarbon-bearing formation ("formation") (104) and a well system (106). The hydrocarbon-bearing formation (104) may include a porous or fractured rock formation that resides underground, beneath the earth's surface ("surface") (108). In the case of the well system (106) being a hydrocarbon well, the reservoir (102) may include a portion of the hydrocarbon-bearing formation (104). The hydrocarbon-bearing formation (104) and the reservoir (102) may include different layers of rock having varying characteristics, such as varying degrees of permeability and porosity. In the case of the well system (106) being operated as a production well, the well system (106) may facilitate the extraction of hydrocarbons (or "production") from the reservoir (102).

In some embodiments, the well system (106) includes a wellbore (120), a well sub-surface system (122), a well surface system (124), and a well control system ("control system") (126). In one or more embodiments, the wellbore (120) may be vertical. However, the wellbore (120) may also be horizontal or deviated without departing from the scope of this disclosure. The control system (126) may control various operations of the well system (106), such as well production operations, well completion operations, well maintenance operations, as well as reservoir operations including monitoring, assessment and development operations. In some embodiments, the control system (126) includes a computer that is the same as or similar to that of computer system (802) described below in FIG. 8 and the accompanying description.

The wellbore (120) may include a bore hole that extends from the surface (108) into a target zone of the hydrocarbon-bearing formation (104), such as the reservoir (102). An upper end of the wellbore (120), terminating at or near the surface (108), may be referred to as the "up-hole" end of the wellbore (120), and a lower end of the wellbore, terminating in the hydrocarbon-bearing formation (104), may be referred to as the "down-hole" end of the wellbore (120). The wellbore (120) may facilitate the circulation of drilling fluids during drilling operations, the flow of hydrocarbon production ("production") (121) (e.g., oil and gas) from the reservoir (102) to the surface (108) during production operations, the injection of substances (e.g., water) into the hydrocarbon-bearing formation (104) or the reservoir (102) during injection operations, or the communication of monitoring devices (e.g., logging tools) into the hydrocarbon-bearing formation (104) or the reservoir (102) during monitoring operations (e.g., during in situ logging operations).

In some embodiments, during operation of the well system (106), the control system (126) collects and records wellhead data (140) for the well system (106). The wellhead data (140) may include, for example, a record of measurements of wellhead pressure (Pwh) (e.g., including flowing wellhead pressure), wellhead temperature (Twh) (e.g., including flowing wellhead temperature), wellhead production rate (Qwh) over some or all of the life of the well system (106), and water cut data. In some embodiments, the measurements are recorded in real-time, and are available for review or use within seconds, minutes or hours of the condition being sensed (e.g., the measurements are available within 1 hour of the condition being sensed). In such an embodiment, the wellhead data (140) may be referred to as "real-time" wellhead data (140). Real-time wellhead data (140) may enable an operator of the well system (106) to assess a relatively current state of the well system (106), and make real-time decisions regarding development of the well system (106) and the reservoir (102), such as on-demand adjustments in regulation of production flow from the well.

In some embodiments, the well surface system (124) includes a wellhead (130). The wellhead (130) may include a rigid structure installed at the "up-hole" end of the wellbore (120), at or near where the wellbore (120) terminates at the Earth's surface (108). The wellhead (130) may include structures for supporting (or "hanging") casing and production tubing extending into the wellbore (120). Production (121) may flow through the wellhead (130), after exiting the wellbore (120) and the well sub-surface system (122), including, for example, the casing and the production tubing. In some embodiments, the well surface system (124) includes flow regulating devices that are operable to control the flow of substances into and out of the wellbore (120). For example, the well surface system (124) may include one or more production valves (132) that are operable to control the flow of production (121). For example, a production valve (132) may be fully opened to enable unrestricted flow of production (121) from the wellbore (120), the production valve (132) may be partially opened to partially restrict (or "throttle") the flow of production (121) from the wellbore (120), and production valve (132) may be fully closed to fully restrict (or "cell") the flow of production (121) from the wellbore (120), and through the well surface system (124).

Keeping with FIG. 1, in some embodiments, the well surface system (124) includes a surface sensing system (134). The surface sensing system (134) may include sensors for sensing characteristics of substances, including production (121), passing through or otherwise located in the well surface system (124). The characteristics may include, for example, pressure, temperature, and flow rate of production (121) flowing through the wellhead (130), or other conduits of the well surface system (124), after exiting the wellbore (120).

In some embodiments, the surface sensing system (134) includes a surface pressure sensor (136) operable to sense the pressure of production (151) flowing through the well surface system (124), after it exits the wellbore (120). The surface pressure sensor (136) may include, for example, a wellhead pressure sensor that senses a pressure of production (121) flowing through or otherwise located in the wellhead (130). In some embodiments, the surface sensing system (134) includes a surface temperature sensor (138) operable to sense the temperature of production (151) flowing through the well surface system (124) after it exits the wellbore (120). The surface temperature sensor (138) may include, for example, a wellhead temperature sensor that senses a temperature of production (121) flowing through or otherwise located in the wellhead (130), referred to as "wellhead temperature" (T_WH). In some embodiments, the surface sensing system (134) includes a flow rate sensor (139) operable to sense the flow rate of production (151) flowing through the well surface system (124), after it exits the wellbore (120). The flow rate sensor (139) may include hardware that senses a flow rate of production (121) (Q_WH) passing through the wellhead (130).

In some embodiments, the well system (106) includes a reservoir simulator (160). For example, the reservoir simulator (160) may include hardware and/or software with functionality for generating one or more reservoir models regarding the hydrocarbon-bearing formation (104) and/or performing one or more reservoir simulations. For example, the reservoir simulator (160) may store well logs and data regarding core samples for performing simulations. A reservoir simulator may further analyze the well log data, the core sample data, seismic data, and/or other types of data to generate and/or update the one or more reservoir models. While the reservoir simulator (160) is shown at a well site, embodiments are contemplated where reservoir simulators are located away from well sites. In some embodiments, the reservoir simulator (160) may include a computer system that is similar to the computer system (802) described below with regard to FIG. 8 and the accompanying description.

Figure 2:
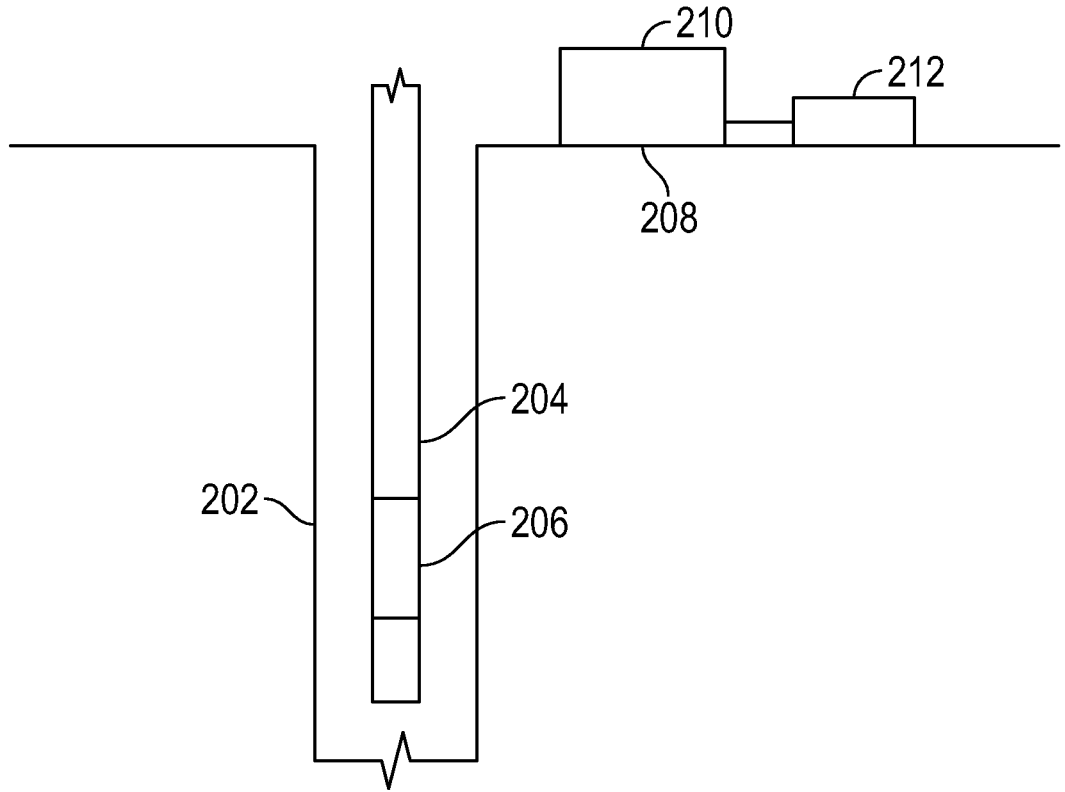
FIG. 2 shows a well testing system in accordance with one or more embodiments.

FIG. 2 shows a well testing system (200) in accordance with one or more embodiments. The well testing system (200) may include a pilot hole (202). In one or more embodiments, a pilot hole (202) may refer to a hole drilled to identify a formation, such as hydrocarbon-bearing formation (104), prior to drilling of a wellbore (120) in a production well system (106). In one or more embodiments, a toolstring (204) may be run into the pilot hole (202). The toolstring (204) may include a well logging assembly (206) configured to perform logging operations within the pilot hole (202).

Figure 8:
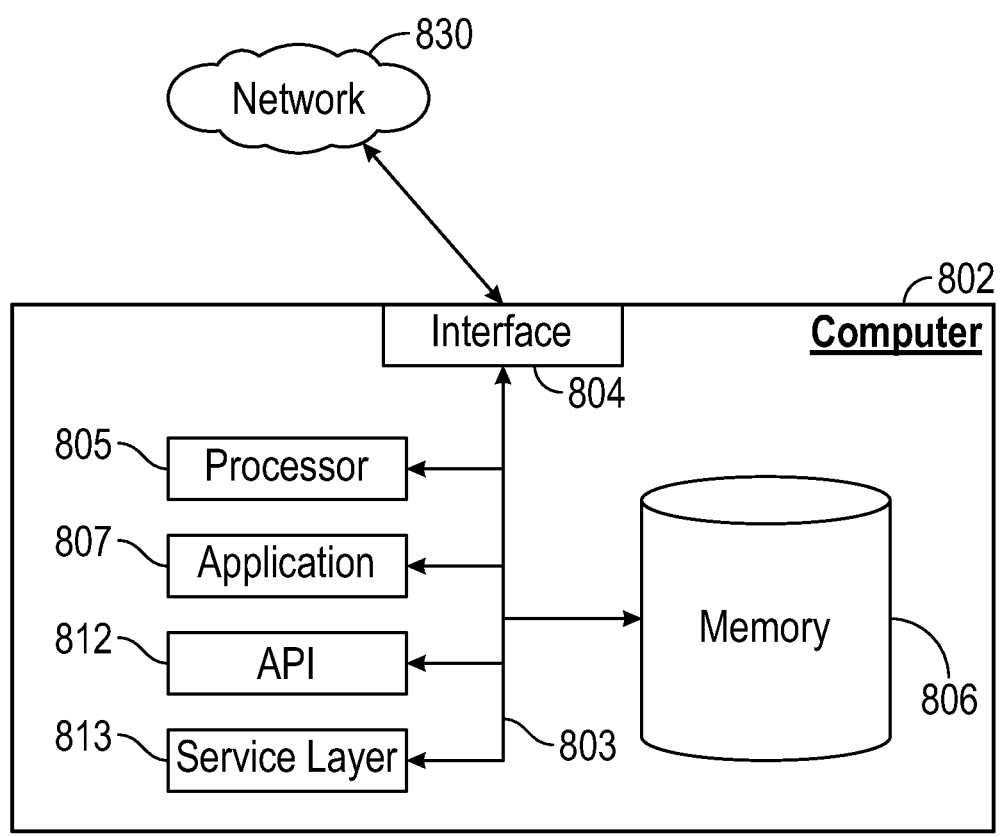
FIG. 8 shows a computer in accordance with one or more embodiments.

In one or more embodiments, the pilot hole (202) may extend from a surface location (208) to a formation. A mechanical earth model (MEM) development system (210)

may also be positioned at the surface location (208). In one or more embodiments, the MEM development system (210) may be included in a control system, such as control system (126). Further, the MEM development system (210) may include a computer system, such as computer system (802) as shown in FIG. 8. A rock analyzer (212) may be connected to the MEM development system (210). In one or more embodiments, the rock analyzer (212) may be configured to perform laboratory testing on core plugs or rock cuttings, which may allow for calibration of rock mechanical properties determined through logging operations.

In one aspect, embodiments disclosed herein relate to using well logging based correlations to construct a mechanical earth model (MEM). Well logging operations may involve measuring data which may be used to estimate rock mechanical properties, in-situ stresses and pore pressure.

With respect to rock mechanical properties, some properties may be measured, and other properties may be calculated. For example, bulk density, compressional slowness ($\Delta t_{comp}$), and shear slowness ($\Delta t_{shear}$) are recorded. These mechanical properties may then be used to calculate other properties, such as dynamic shear, shown in Equation 1, and bulk moduli, shown in Equation 2:

$$G_d = \rho V_s^2 = \frac{\rho}{(\Delta t_{shear})^2},\qquad \text{Equation 1,}$$

$$K_d = \rho V_P^2 = \frac{\rho}{(\Delta t_{comp})^2},\qquad \text{Equation 2,}$$

where $G_d$ is the dynamic shear modulus in Pa, $K_d$ is the bulk modulus in Pa, $\rho$ is the bulk density of the formation in $$\frac{\text{kg}}{\text{m}^3},$$

$V_s$ is the shear wave velocity in $$\frac{\text{m}}{\text{sec}},$$

and $V_P$ is the compressional wave velocity in $$\frac{m}{\text{sec}}.$$

In some logging operations, the logging data may record bulk density in $$\frac{\text{g}}{\text{cm}^3}$$

and slowness in $$\frac{\mu s}{\text{ft}}.$$

However, the dynamic shear modulus and the bulk modulus may be expected to have a unit of psi. In such situations, a conversion coefficient may need to be applied when calculating the dynamic shear modulus and the bulk modulus, respectively, as shown in Equations 3 and 4:

$$G_d = (13474.45)\frac{\rho}{(\Delta t_{shear})^2}, \qquad \text{Equation 3,}$$

$$K_d = (13474.45)\frac{\rho}{(\Delta t_{comp})^2}, \qquad \text{Equation 4,}$$

where 13474.45 is the conversion factor, and $G_d$ and $K_d$ each have a unit of Mpsi.

The dynamic shear and bulk moduli may be utilized in the calculation of dynamic Young's modulus ($E_d$) and Poisson's ratio ($v_d$), as shown in Equations 5 and 6, respectively:

$$E_d = \frac{9K_d G_d}{3K_d + G_d}, \qquad \text{Equation 5,}$$

$$v_d = \frac{3K_d - 2G_d}{2(3K_d + G_d)}, \qquad \text{Equation 6.}$$

The transmission speeds of compressional and shear waves, as shown in Equations 3 and 4, may be determined from the elastic moduli and rock density. However, in practice, dynamically derived elastic properties are dramatically greater than statically derived properties due to the effects of anisotropy, heterogeneities, stress state, drainage conditions, and strain amplitude. For example, the effects described above may be on the order of $10^{-7}\text{-}10^{-6}$ in dynamic measurements and on the order of $10^{-2}\text{-}10^{-3}$ for static measurements. In order to bridge this gap, it may be necessary to develop correlational equations through dynamic and static laboratory tests and regression analysis. For example, Equation 7 shows a correlational equation which may be applied to sandstones:

$$\log^{E_s} = A_0 + A_1 \log^{E_d}, \qquad \text{Equation 7,}$$

where $E_s$ is the static Young's modulus, $A_0$ is the intercept, $A_1$ is the slope of the linear curve, and $E_d$ is the dynamic Young's modulus. In one or more embodiments, porosity may have a dominant influence on $A_0$ and $A_1$. For example, in some embodiments, sandstones with porosity in the range of 10%-15% may have an $A_0$ value of 2.137 and an $A_1$ value of 0.6612.

Rock strength may be commonly characterized by the Mohr-Coulomb failure parameters: unconfined compressive strength (UCS) and friction angle ($\varphi$). Rock strength properties depend on the composition and internal structures including porosity, grain size, mineralogy and cement types. Strength properties are also related to the loading environment, which can include properties such as confining pressure, strain rate, and temperature. In sandstones, for example, the UCS is related to Young's modulus, as shown in Equation 8, and the friction angle is correlated to porosity ($\phi$) as shown in Equation 9:

$$UCS = 2.280 + 4.1089\, E_s, \qquad \text{Equation 8,}$$

$$\varphi = 55(0.55 - \varphi), \qquad \text{Equation 9}$$

where UCS has a unit of MPa, $E_s$ has a unit of GPa, $\varphi$ is measured in degrees, and $\phi$ is unitless.

Further, laboratory data indicates that tensile strength (GT) is linearly related to UCS, as shown in Equation 10:

$$\sigma^T = K * UCS, \qquad \text{Equation 10,}$$

where K is a facies and zone based factor with a default value of 0.1.

Turning now to in-situ stresses and pore pressure, the vertical stress, otherwise known as overburden stress, may usually be obtained by integrating density log data, as shown in Equation 11:

$$dS_V = g \times \frac{\rho_w h_w + \int_{h_w + h_{ag}}^{z} \rho(z)dz}{z}, \qquad \text{Equation 11}$$

where g ($m/s^2$) is the gravitational acceleration, $dS_V$ (kPa/m) is the overburden stress gradient, $\rho_w$(g/cc) and $h_w$(m) are the density and the depth of the offshore water column, respectively, z (m) is the TVD measured from the Kelly Bushing level, $h_{ag}$ (m) is the airgap between the Kelly Bushing level and the water surface (offshore) or the ground surface (onshore), and $\rho(z)$ (g/cc) is the bulk density of the formation at TVD z. Since well logging data are discretized along the depth, an integration approximation may be used, as shown in Equation 12:

$$dS_{Vi} = g \times \frac{\rho_w h_w + \sum_{j=i_f}^{i} \rho_j(z_{j+1} - z_j)}{z_i}, \qquad \text{Equation 12}$$

where $dS_{Vi}$, $\rho_i$, $z_i$ are the overburden stress gradient, bulk density, and TVD at the i-th depth, and $i_f$ is the index of the TVD of the sea floor (offshore) or ground surface (onshore).

In a subsurface environment, formation pore pressure may vary from hydrostatic pressure, which may refer to a normal pore pressure, to severe overpressure. In one or more embodiments, severe overpressure may be more than double the hydrostatic pressure. Overpressure can be causes by various reasons, such as under-compaction, fluid expansion, and mineral transformation. Pore pressure prediction may be of critical importance to wellbore drilling planning and operation. Normal pore pressure may refer to the hydrostatic pressure introduced by the fluid column from the groundwater surface to the depth of interest, as shown in Equation 13:

$$P_n = \rho_f g h, \qquad \text{Equation 13,}$$

where $P_n$ is the normal pore pressure (hydrostatic pressure); $\rho_f$ is the fluid density; h is the depth of the interest measured from the groundwater surface.

Correlation of overpressure with well logging data may involve developing a correlational equation combining overburden pressure and porosity. Overpressure is commonly related to the compaction process, which may affect the porosity and sonic velocity of the formation. For example, the correlational equation shown in Equation 14 allows for the calculation of overpressure from overburden pressure and porosity:

$$P_p = \left[ S_V - (S_V - \alpha p_n) \frac{\ln \phi_0 - \ln \phi}{cZ} \right] \Big/ \alpha, \qquad \text{Equation 14}$$

where $\phi_0$ is the porosity of the formation at mudline, $\phi$ is the porosity of formation at the depth of interest, Z is the depth below the mudline, c is a constant and can be obtained from the normal compaction porosity trend line, and $\alpha$ is Biot coefficient of effective stress.

Ideally, the Biot coefficient would be measured in laboratory tests, if rock samples and testing resources, such as equipment and personnel, are available. However, the Biot coefficient may also be estimated using logging data. For example, there is a correlation between the Biot coefficient and porosity, as shown in Equation 15:

$$\alpha = \frac{1}{a} \ln \frac{\phi}{\phi_c} + 1, \qquad \text{Equation 15}$$

where a is an empirical coefficient, with a default value of 4, and $\phi_c$ is the critical porosity, with a default value of 0.45.

In one or more embodiments, horizontal stressed may be computed using a poroelastic horizontal strain model. In this model, horizontal stresses may be calculated from vertical stress and pore pressure, while assuming uniaxial strain condition and superimposing tectonic stress, as shown in Equations 16 and 17:

$$S_h - \alpha P_p = \frac{v}{1-v}(S_V - \alpha P_p) + \frac{E}{1-v^2}\varepsilon_h + \frac{vE}{1-v^2}\varepsilon_H, \qquad \text{Equation 16,}$$

$$S_H - \alpha P_p = \frac{v}{1-v}(S_V - \alpha P_p) + \frac{E}{1-v^2}\varepsilon_H + \frac{vE}{1-v^2}\varepsilon_h, \qquad \text{Equation 17,}$$

where $S_h$ is the minimum horizonal stress; $S_H$ is the maximum horizonal stress; $\varepsilon_h$ is the minimum principal tectonic strain; $\varepsilon_H$ is the maximum principal tectonic strain.

In one or more embodiments, a stress regime may express the relative magnitude of three in-situ principal stresses (vertical stress ($S_V$), maximum horizontal stress ($S_H$), and minimum horizontal stress ($S_h$)) as a result of geological tectonic kinematics. Tectonic regimes can be categorized into normal faulting (NF), reverse faulting (RF), and strike-slip (SS).

In a normal faulting (NF) stress regime, the vertical stress is the maximum in-situ stress, and the minimum horizontal stress is the minimum in-situ stress. In such a stress regime, the vertical stress may be greater than the maximum horizontal stress, which may be greater than the minimum horizontal stress. Vertical stress and minimum horizontal stress may be constrained by the relationship shown in Equation 18:

$$\frac{S_V - \alpha p_p}{S_h - \alpha p_p} \leq \left[ (1 + \mu^2)^{\frac{1}{2}} + \mu \right]^2, \qquad \text{Equation 18,}$$

where $\mu = \tan \varphi$, is the frictional coefficient.

In a reverse faulting (RF) stress regime, the maximum horizontal stress is the maximum in-situ stress and the vertical stress is the minimum in-situ stress. In such a stress regime, the maximum horizontal stress is greater than the minimum horizontal stress, which is greater than the vertical stress. Vertical stress and maximum horizontal stress may be constrained by the relationship shown in Equation 19:

$$\frac{S_H - \alpha p_p}{S_V - \alpha p_p} \leq \left[ (1 + \mu^2)^{\frac{1}{2}} + \mu \right]^2, \qquad \text{Equation 19.}$$

In a strike-slip (SS) faulting regime, the maximum horizontal stress is the maximum in-situ stress and the minimum horizontal stress is the minimum in-situ stress. In such a stress regime, the maximum horizontal stress is greater than the vertical stress, which is greater than the minimum horizontal stress. The maximum and minimum horizontal stresses may be constrained by the relationship in Equation 20:

$$\frac{S_H - \alpha p_p}{S_h - \alpha p_p} \leq \left[ (1 + \mu^2)^{\frac{1}{2}} + \mu \right]^2, \qquad \text{Equation 20}$$

In one or more embodiments, borehole breakouts may refer to enlarged regions of the borehole in the direction of the minimum principal stress where compressive stress is greatest. Both field data and laboratory testing indicate that breakout width and depth are affected by in-situ stress magnitudes and rock type. Even though breakout depth may continue to grow after initiation, breakout width may be expected to remain stable. As a result, Equation 21 may compute the maximum horizontal stress from breakouts in vertical boreholes based on an equilibrium between the stress concentration and rock strength at the edge of a breakout.

$$S_H = \frac{UCS + \Delta P_W + 2P_p}{1 - 2\cos 2\theta_b} - S_h \frac{1 + 2\cos 2\theta_b}{1 - 2\cos 2\theta_b}, \qquad \text{Equation 21,}$$

where $S_H$ is the maximum horizontal stress, $S_h$ is the minimum horizontal stress, UCS is the uniaxial compressive strength of the formation rock, $\Delta P_W$ is the net fluid pressure inside the wellbore (i.e., the difference between the wellbore pressure, $P_W$, and the origin formation pore pressure, $P_p$), $\theta$ is the wellbore angle measured from the maximum horizontal stress, and $\theta_b$ is the wellbore angle where the rock mass on the borehole wall starts to run into plastic yielding, leading to a breakout angle equal to $2\phi_b$.

Breakout zones around a borehole may result from stress concentration induced by the in-situ stresses. Caliper logging data measuring breakout angle and breakout depth in pilot holes may be used, in one or more embodiments, to refine the estimated in-situ stresses used in construction of a mechanical earth model (MEM).

The wellbore fluid, mud weight, or pressure required to prevent a borehole collapse may be referred to as collapse mud weight (CMW) or collapse mud pressure (CMP). CMW is related to the in-situ pore pressure and stresses, rock properties, and wellbore or pilot hole trajectory. For a vertical impermeable borehole, the collapse mud pressure $$\left( P_w^C \right)$$

may be evaluated using Equation 22:

$$P_w^C = \frac{3S_H - S_h - 2P_p - ucs}{1 + \dfrac{1 + \sin \varphi}{1 - \sin \varphi}} + P_p, \qquad \text{Equation 22.}$$

In one or more embodiments, the techniques described in detail herein may be utilized to construct a mechanical earth model (MEM). The process of constructing the MEM will now be discussed in detail. Components described in FIGS. 1 and 2 may be referenced for illustrative purposes.

A pilot hole (202) may be drilled from a surface location (208) to a formation. In one or more embodiments, the pilot hole (202) may be vertical. Pore pressure in the pilot hole (202) may be measured using a drill stem test (DST) performed after the pilot hole (202) has been drilled. The logging assembly (206) may be lowered into the pilot hole (202) and may use onboard tools to perform density logging, sonic logging, and caliper logging.

Rock mechanical properties, including Young's modulus, Poisson's ratio, UCS, and friction angle, may be estimated from the data generated by sonic logging using Equations 1-10 described above. The correlated values may then be calibrated with rock mechanics laboratory tests (e.g., a uniaxial compression test and a triaxial test) on core plugs retrieved from the formation at different depths in the pilot hole (202).

The horizontal stresses may be estimated using a poroelastic horizontal strain model, illustrated above in Equations 16 and 17. If the minimum horizontal stress is obtained by correlation, calibration may be required. The minimum horizontal stress may be calibrated with the measurements produced by performed minifrac tests at different depths in the pilot hole (202). The vertical stress may be obtained by integrating the data generated through density logging. The estimation for the maximum horizontal stress may be refined based on the estimated vertical stress. Refining the maximum horizontal stress estimation may, in accordance with one or more embodiments, ensure that no known constraints are violated. In one or more embodiments, the known constraints may include the global pattern of tectonic strings, the basin stress regime, and a breakouts-versus-mud weight-window. One skilled in the art will readily appreciate that this list of constraints is not exhaustive and is not intended to be limiting in terms of this disclosure.

Figure 3:
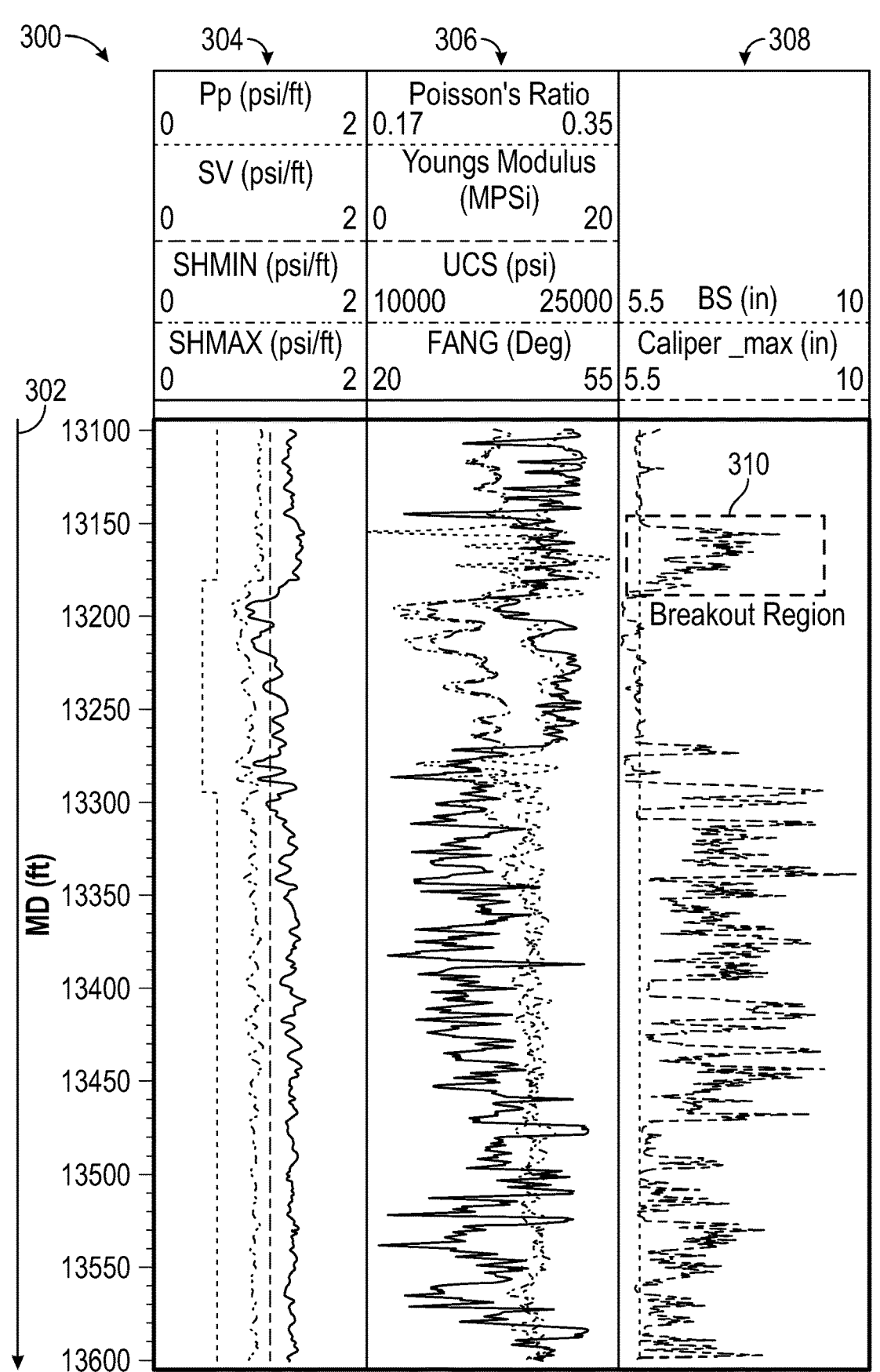
FIG. 3 shows a plot in accordance with one or more embodiments.

FIG. 3 shows a plot in accordance with one or more embodiments. More specifically, FIG. 3 shows a correlation-based MEM (300) in accordance with one or more embodiments. The MEM (300) may have a vertical axis (302). In one or more embodiments, true vertical depth may be displayed on the vertical axis (302). There may be three blocks displayed on the MEM. The first block (304) may display formation pore pressure ($P_p$), vertical stress ($S_V$), minimum horizontal stress ($S_h$), and maximum horizontal stress ($S_H$). The second block (306) may display rock mechanical properties. The third block (308) may display caliper logging data. In one or more embodiments, the maximum horizontal stress may be calculated with $\varepsilon_h$=0.0003, $\varepsilon_H$=0.0004, and $\alpha$=1.0. Further, in one or more embodiments, as displayed in FIG. 3, pore pressure, vertical stress, maximum horizonal stress, and minimum horizontal stress are presented in their gradients (i.e., the magnitudes of the variables are divided by true vertical depth (TVD)).

Since the vertical stress is obtained from density logging data, it may be assumed to be accurate and reliable. Assuming that the minimum horizontal stress has been calibrated using minifrac test data, the maximum horizontal stress may be constrained using the reverse faulting stress regime and the strike-slip stress regime. Such constraining may be achieved by applying Equations 19 and 20.

Figure 4:
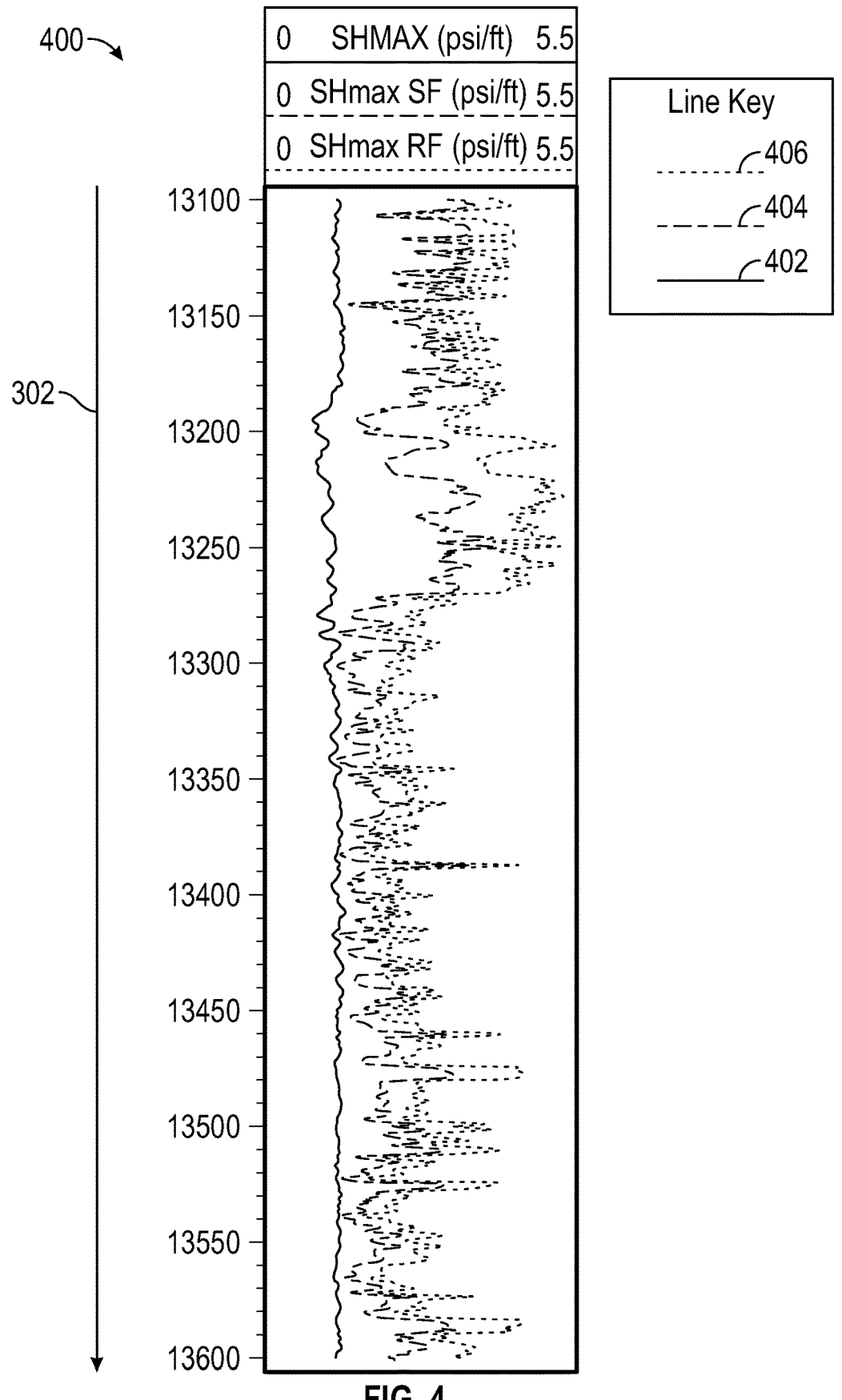
FIG. 4 shows a plot in accordance with one or more embodiments.

FIG. 4 shows a plot in accordance with one or more embodiments. More specifically, FIG. 4 shows a comparison plot (400) between calculated maximum horizontal stress and limiting values calculated using Equations 19 and 20. Line (402) may display the maximum horizontal stress calculated using the poroelastic model. Lines (404) and (406) may represent the maximum horizontal stress calculated using the SS regime and the RF regime, respectively. As shown, line (402) does not cross either of lines (404) and (406). As such, the calculated maximum horizontal stress does not violate the constraints generated by the SS and RF stress regimes.

Caliper logging data may indicate the presence of breakout regions within the formation. For example, referring back to FIG. 3, box (310) highlights a region in which extensive borehole breakout occurred in the pilot hole (202) after drilling. In one or more embodiments, the breakout regions observed in the caliper logging data may be compared to the correlation-based MEM. The breakout angle may be computed from the maximum horizontal stress, the minimum horizontal stress, pore pressure, wellbore pressure, and rock UCS using Equations 23 and 24:

$$\cos 2\theta_b = \frac{S_H + S_h - (UCS + \Delta P_W + 2P_p)}{2(S_H - S_h)}, \qquad \text{Equation 23,}$$

$$\phi_b = 90° - \theta_b, \qquad \text{Equation 24.}$$

Figure 5:
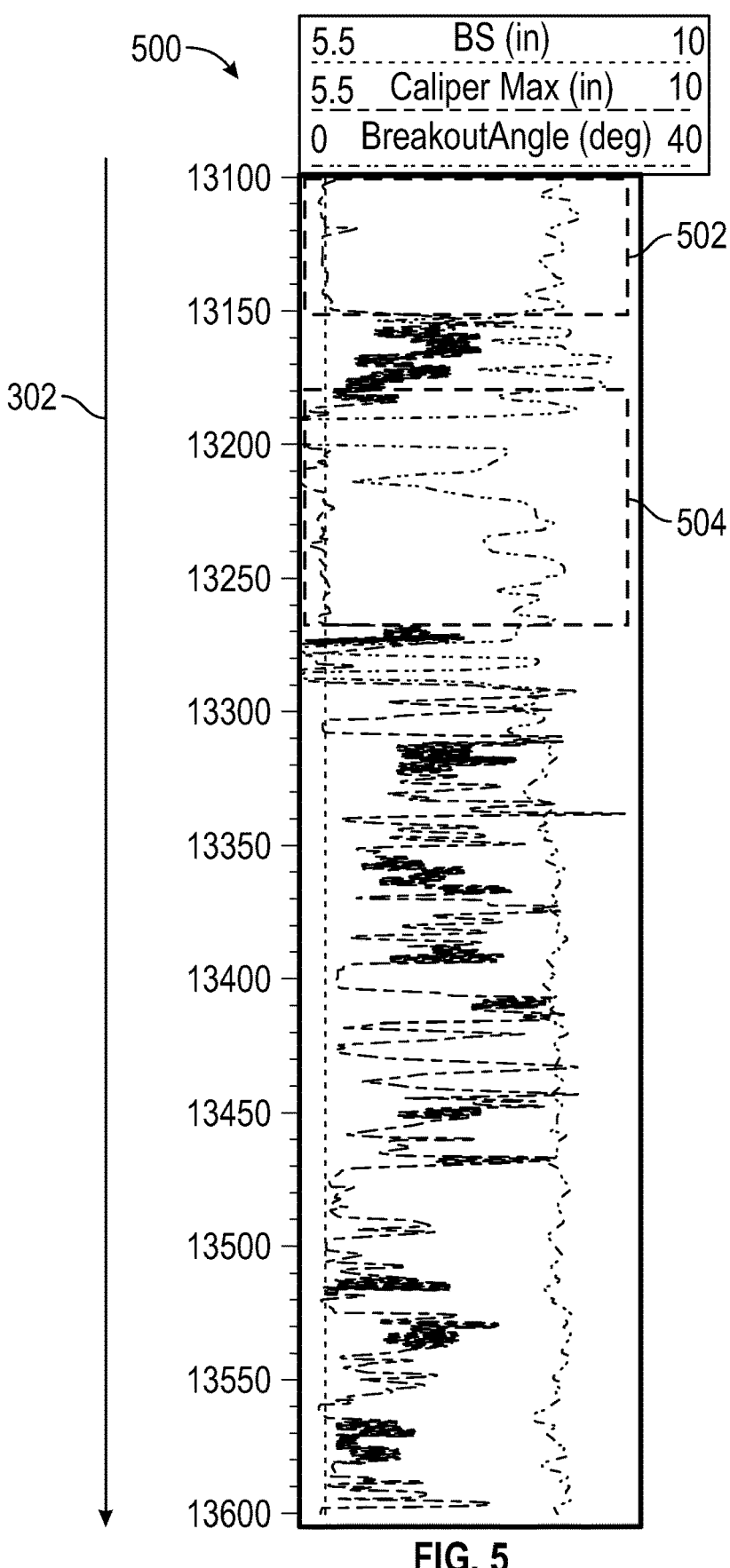
FIG. 5 shows a plot in accordance with one or more embodiments.

FIG. 5 shows a plot in accordance with one or more embodiments. More specifically, FIG. 5 shows a comparison plot between caliper logging data and estimated in-situ stresses. In one or more embodiments, the caliper logging data in the pilot hole (202) may only provide the largest hole size (i.e., radius) or, equivalently, breakout depth at each vertical true depth. However, the caliper logging data does not provide breakout angle/width. In-situ stresses, by comparison, are only related to breakout angle/width. In such situations, breakout depth may be used as a qualitative indicator. For example, if the breakout depth measured from the pilot hole (202) center (Caliper_max) is greater than the pilot hole radius (BS) at a given true vertical depth, it may be determined that breakout has occurred at that depth.

Comparing caliper logging data with the calculated breakout angle allows for the identification of inconsistencies. For example, FIG. 5 shows a first region (502) and a second region (504) in which the caliper logging data reflects that no breakout occurred, while the calculated breakout angles are greater than zero. As a result, inconsistencies exist between the two data sets, and it can be inferred that the maximum horizontal stresses have been over-estimated. In such situations, it may be necessary to adjust the tectonic strains used in the poroelastic model (i.e., in Equation 17) and to then recalculate the maximum horizontal stress in each of the first region (502) and the second region (504).

Figure 6:
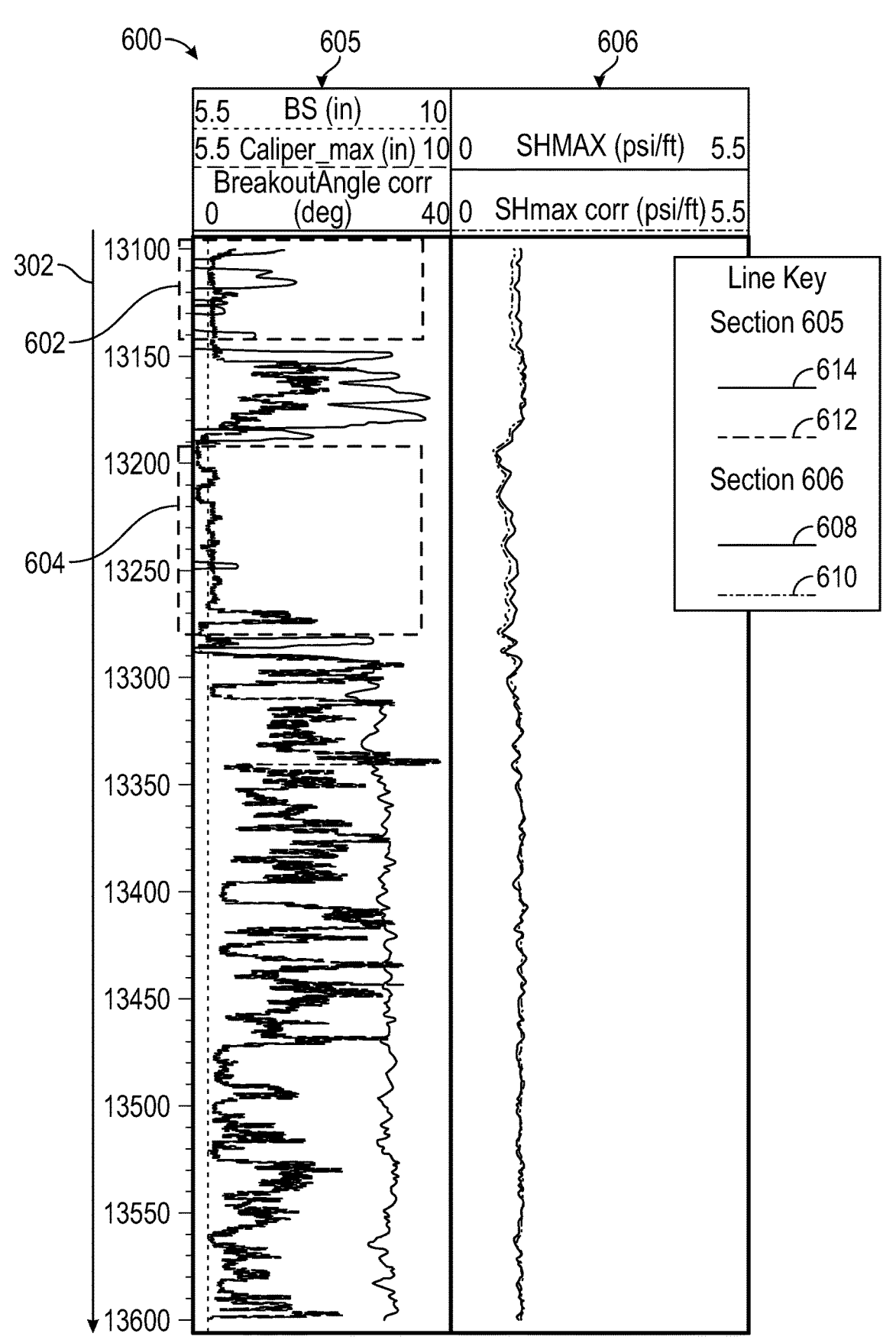
FIG. 6 shows a plot in accordance with one or more embodiments.

FIG. 6 shows a plot (600) in accordance with one or more embodiments. More specifically, FIG. 6 shows an updated version of FIG. 5 utilizing recalculated maximum horizontal stress values in the first region (602) and the second region (604). In producing FIG. 6, $\varepsilon_H$ may be reduced slightly to 0.0003 in first region (502) and the second region (504). Maximum horizontal stress may then be recalculated based on this slightly reduced value. A comparison between the original maximum horizontal stress and the recomputed maximum horizontal stress is displayed in block (606) of the plot (600). Block (606) displays the original maximum horizontal stress in line (608) and the recomputed maximum horizontal stress in line (610). As shown, the recomputed maximum horizontal stress is only slightly less than the original maximum horizontal stress.

However, when comparing the first and second regions (602, 604) displayed in FIG. 6 to the first and second regions (502, 504) displayed in FIG. 5, it is immediately noticeable that the slight adjustment of maximum horizontal stress induces a consistency between the caliper logging data (displayed by line (612)) and the calculated breakout angle (displayed by line (614)) in the second region (602), both of which are displayed in block (605). Further, the inconsistencies still present in the first region (602) are small enough to be considered insignificant.

The calibrated MEM may be used to calculate a safe mud weight window. In one or more embodiments, the lower bound of the safe mud weight window is the critical or minimum mud weight required to prevent a borehole breakout. The upper bound of the safe mud weight window is the critical or maximum mud weight required to avoid borehole fracturing.

Figure 7:
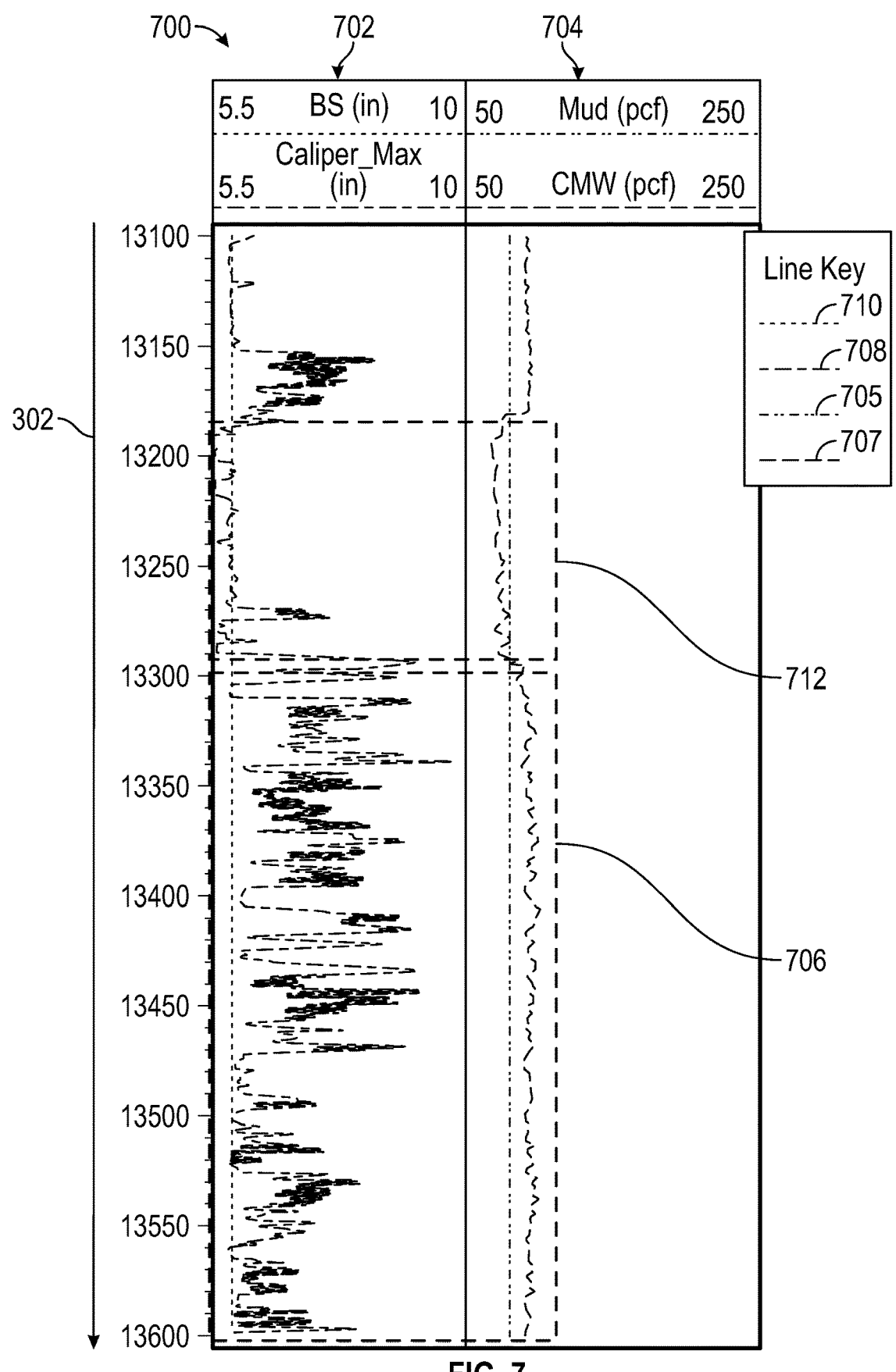
FIG. 7 shows a plot in accordance with one or more embodiments.

FIG. 7 shows a plot (700) in accordance with one or more embodiments. More specifically, FIG. 7 shows a plot comparing caliper logging data (which may record pilot hole (202) radius), displayed in block (702), to operational mud weight and collapse mud weight, displayed in block (704). In situations where operation mud weight, represented by line (705) is lower than collapse mud weight, represented by line (707), highlighted in box (706), borehole breakout may occur. As shown in plot (700), this prediction is consistent with the caliper logging data, displayed in block (702), where breakout depth measured from the pilot hole (202) center (represented by line (708)) is greater than the pilot hole (202) radius (represented by line (710)) at various given true vertical depth, indicating borehole breakouts. Further, borehole breakout may be prevented in instances where operation mud weight is greater than collapse mud weight, highlighted in box (712). This may also be consistent with the caliper logging data, where breakout depth measured from the pilot hole (202) is less than or equal to the pilot hole (202) radius.

In one or more embodiments, there may be inconsistencies present in the model between the caliper logging data and the operation mud weight and collapse mud weight comparison. For example, in FIG. 7, box (714) indicates a region where the caliper logging data indicates that no breakout has occurred, while a comparison of operation mud weight and collapse mud weight suggests that a breakout has occurred. In such embodiments, further calibration of the model may be required.

FIG. 8 depicts a block diagram of a computer system (802) used to provide computational functionalities associated with described algorithms, methods, functions, processes, flows, and procedures as described in this disclosure, according to one or more embodiments. The illustrated computer (802) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (802) may include a computer that includes an input device, such as a keypad, keyboard, touch screen, or other device that can accept user information, and an output device that conveys information associated with the operation of the computer (802), including digital data, visual, or audio information (or a combination of information), or a GUI.

The computer (802) can serve in a role as a client, network component, a server, a database or other persistency, or any other component (or a combination of roles) of a computer system for performing the subject matter described in the instant disclosure. The illustrated computer (802) is communicably coupled with a network (830). In some implementations, one or more components of the computer (802) may be configured to operate within environments, including cloud-computing-based, local, global, or other environment (or a combination of environments).

At a high level, the computer (802) is an electronic computing device operable to receive, transmit, process, store, or manage data and information associated with the described subject matter. According to some implementations, the computer (802) may also include or be communicably coupled with an application server, e-mail server, web server, caching server, streaming data server, business intelligence (BI) server, or other server (or a combination of servers).

The computer (802) can receive requests over network (830) from a client application (for example, executing on another computer (802)) and responding to the received requests by processing the said requests in an appropriate software application. In addition, requests may also be sent to the computer (802) from internal users (for example, from a command console or by other appropriate access method), external or third-parties, other automated applications, as well as any other appropriate entities, individuals, systems, or computers.

Each of the components of the computer (802) can communicate using a system bus (803). In some implementations, any or all of the components of the computer (802), both hardware or software (or a combination of hardware and software), may interface with each other or the interface (804) (or a combination of both) over the system bus (803) using an application programming interface (API) (812) or a service layer (813) (or a combination of the API (812) and service layer (813). The API (812) may include specifications for routines, data structures, and object classes. The API (812) may be either computer-language independent or dependent and refer to a complete interface, a single function, or even a set of APIs. The service layer (813) provides software services to the computer (802) or other components (whether or not illustrated) that are communicably coupled to the computer (802). The functionality of the computer (802) may be accessible for all service consumers using this service layer. Software services, such as those provided by the service layer (813), provide reusable, defined business functionalities through a defined interface. For example, the interface may be software written in JAVA, C++, or other suitable language providing data in extensible markup language (XML) format or another suitable format. While illustrated as an integrated component of the computer (802), alternative implementations may illustrate the API (812) or the service layer (813) as stand-alone components in relation to other components of the computer (802) or other components (whether or not illustrated) that are communicably coupled to the computer (802). Moreover, any or all parts of the API (812) or the service layer (813) may be implemented as child or sub-modules of another software module, enterprise application, or hardware module without departing from the scope of this disclosure.

The computer (802) includes an interface (804). Although illustrated as a single interface (804) in FIG. 8, two or more interfaces (804) may be used according to particular needs, desires, or particular implementations of the computer (802). The interface (804) is used by the computer (802) for communicating with other systems in a distributed environment that are connected to the network (830). Generally, the interface (804) includes logic encoded in software or hardware (or a combination of software and hardware) and operable to communicate with the network (830). More specifically, the interface (804) may include software supporting one or more communication protocols associated with communications such that the network (830) or interface's hardware is operable to communicate physical signals within and outside of the illustrated computer (802).

The computer (802) includes at least one computer processor (805). Although illustrated as a single computer processor (805) in FIG. 8, two or more processors may be used according to particular needs, desires, or particular implementations of the computer (802). Generally, the computer processor (805) executes instructions and manipulates data to perform the operations of the computer (802) and any machine learning networks, algorithms, methods, functions, processes, flows, and procedures as described in the instant disclosure.

The computer (802) also includes a memory (806) that holds data for the computer (802) or other components (or a combination of both) that can be connected to the network (830). For example, memory (806) can be a database storing data consistent with this disclosure. Although illustrated as a single memory (806) in FIG. 8, two or more memories may be used according to particular needs, desires, or particular implementations of the computer (802) and the described functionality. While memory (806) is illustrated as an integral component of the computer (802), in alternative implementations, memory (806) can be external to the computer (802).

The application (807) is an algorithmic software engine providing functionality according to particular needs, desires, or particular implementations of the computer (802), particularly with respect to functionality described in this disclosure. For example, application (807) can serve as one or more components, modules, applications, etc. Further, although illustrated as a single application (807), the application (807) may be implemented as multiple applications (807) on the computer (802). In addition, although illustrated as integral to the computer (802), in alternative implementations, the application (807) can be external to the computer (802).

There may be any number of computers (802) associated with, or external to, a computer system containing a computer (802), wherein each computer (802) communicates over network (830). Further, the term "client," "user," and other appropriate terminology may be used interchangeably as appropriate without departing from the scope of this disclosure. Moreover, this disclosure contemplates that many users may use one computer (802), or that one user may use multiple computers (802).

FIG. 9 depicts a flowchart in accordance with one or more embodiments. More specifically, FIG. 9 depicts a flowchart 900 of a method of constructing a mechanical earth model (MEM) in accordance with one or more embodiments. Further, one or more blocks in FIG. 9 may be performed by one or more components as described in FIGS. 1-8. While the various blocks in FIG. 9 are presented and described sequentially, one of ordinary skill in the art will appreciate that some or all of the blocks may be executed in different orders, may be combined, may be omitted, and some or all of the blocks may be executed in parallel. Furthermore, the blocks may be performed actively or passively.

Initially, vertical stress may be computed by integrating a density logging data set. S902. Prior to construction of the MEM, density logging, sonic logging, and caliper logging may be performed in the pilot hole (202). In one or more embodiments, a well logging assembly (206) may be used to perform logging operations within the pilot hole (202). Pore pressure and one or more mechanical properties may be estimated by applying one or more correlation models or equations, S904. For example, applying Equations 1-10 may allow for estimation of pore pressure and one or more mechanical properties. In one or more embodiments, the one or more mechanical properties may include Young's modulus, Poisson's ratio, unconfined compressive strength (UCS), frictional angle, and tensile strength. In one or more embodiments, a rock analyzer (212) may be used to perform laboratory testing on core plugs or rock cuttings. The laboratory testing may allow for calibration of the one or more mechanical properties estimated from sonic logging and the application of Equations 1-10.

The pore pressure may be calibrated with drill stem test (DST) data, S906. The one or more mechanical properties may be calibrated with one or more laboratory tests performed on a plurality of core plugs or a plurality of rock cuttings, S908. For example, in one or more embodiments, the one or more laboratory tests may include a uniaxial compression test and a triaxial test.

Minimum horizontal stress may be estimated using the one or more correlation models, S910. For example, Equation 16 may be applied to perform such an estimation. The minimum horizontal stress may be calibrated using one or more minifrac tests, S912. Maximum horizontal stress may be estimated using the one or more correlation models while assuming one or more correlation parameters, S914. For example, Equation 17 may be applied to perform such an estimation. Estimating minimum and maximum horizontal stresses using Equations 16 and 17 may be referred to as using a poroelastic model. In one or more embodiments, the one or more correlation parameters may include principle tectonic strains. The maximum horizontal stress may be calibrated using a global pattern of tectonic strains and a basin stress regime, S916.

In one or more embodiments, one or more breakout angles may be computed from the maximum horizontal stress and the minimum horizontal stress at one or more total vertical depths. Further, the one or more breakout regions may be defined based, at least in part, on the one or more breakout angles. The one or more breakout regions may be evaluated using the calibrated MEM, the well trajectory, and the geometry of the pilot hole (202), S918. In one or more embodiments, the geometry may refer to the pilot hole radius. The one or more computed breakout regions may be compared to the caliper logging data set, S920.

The method may also include determining there is an inconsistency between the one or more computed breakout regions and the caliper logging data set. In one or more embodiments determining there is an inconsistency may refer to situations in which the caliper logging data set indicates that no breakout has occurred, while the computed breakout angles are greater than zero. Determining there is an inconsistency may involve plotting the one or more breakout angles, one or more breakout depths and a pilot hole size, observing that the caliper logging data set reports an absence of a breakout region, observing that the one or more computed breakout angles are greater than zero, and determining that the maximum horizontal stress is over-estimated.

In such embodiments, it may be necessary to re-estimate the maximum horizontal stress using the one or more correlation models (Equation 17) while assuming one or more correlation parameters. In one or more embodiments, the one or more correlation parameters may be adjusted in order to refine the maximum horizontal stress. The one or more breakout regions may then be re-evaluated using the MEM, the trajectory of the well, and the geometry of the pilot hole. In order to determine if the refining of maximum horizontal stress was effective, a consistency between the one or more breakout regions and the caliper logging data set may be checked. The maximum horizontal stress may be re-estimated and refined until the caliper logging data set and the calculated breakout angles are consistent.

Once it has been determined that the caliper logging data set and the calculated breakout angles are consistent, one or more collapse mud weights may be evaluated in comparison to an operating mud weight using the MEM, the trajectory of the well, and the geometry of the pilot hole. Any breakout regions indicated by the one or more collapse muds weights and the operating mud weight may then be compared to the one or more breakout regions indicated in the MEM (via both calculation and caliper logging data). As discussed with respect to FIG. 7, regions in which the collapse mud weight is greater than the operating mud weight may indicate breakout has occurred.

In one or more embodiments, there may be an inconsistency between the breakout regions indicated by the one or more collapse muds weights and the operating mud weight and the one or more breakout regions indicated in the MEM. As a result, it may be necessary to return to step S914 and to re-estimate the maximum horizontal stress using the one or more correlation models while assuming one or more correlation parameters. The correlation parameters may be further adjusted in order to refine the maximum horizontal stress.

Steps S916 and S918 may then be repeated. More specifically, one or more breakout regions may be evaluated using the MEM, the trajectory of the well, and the geometry of the pilot hole. Further, a consistency between the one or more breakout regions and the caliper logging data set may be checked. The maximum horizontal stress may be re-estimated and refined until there is a consistency between the one or more calculated breakout regions and the caliper logging data, and a consistency between the one or more breakout regions displayed on the MEM and the breakout regions indicated by comparison of the collapse mud weight and the operation mud weight.

The method displayed in flowchart (900) may also include calculating a safe mud weight window, where the lower bound of the safe mud weight window is a minimum mud weight required to prevent a borehole breakout and where the upper bound of the safe mud weight window is a maximum mud weight required to avoid borehole fracturing.

Embodiments of the present disclosure may provide at least one of the following advantages. A MEM is the data repository of in situ characteristics for an earth volume. The integration of mechanical earth models into operators' workflows is important for nearly all aspects of well construction and production. An MEM can be crucial for reducing risk, cutting costs and increasing operational efficiency. Not only are MEMs important during the early exploration and development phase—when little is known about the field—but also late in life when the field requires revitalization through such activities as infill drilling, refracturing and enhanced recovery operations. Geoscientists continue using and updating MEMs as they accumulate and integrate data throughout the life of a field. Mechanical earth models are becoming vital and indispensable repositories of data for many oilfield activities.

MEMs may be useful on their own, for example, stress orientation for planning a horizontal well and its completion. Moreover, an MEM contains all available information required to assess how rocks and fractures deform in response to drilling, completion and production operations. Geoscientists conduct these assessments by linking the MEM to other, specialized simulation software such as reservoir, hydraulic fracture, basin and structural geology reconstruction models. In addition, engineering software tools use geomechanical information from MEMs as input to determine how in situ deformation and changes in stress and rock properties affect an operation's performance. For instance, by simultaneously combining reservoir and geomechanical models, engineers can assess how production influences the effective stresses, the opening and closing of natural fractures and the corresponding change in rock mass permeabilities. Such effects are important when engineers assess the reservoir behavior, production rates, recovered volumes and economics of a proposed production schedule.

Engineers use MEMs to understand past experiences and identify the root causes of unexpected events such as early water breakthrough or drilling fluid loss. Drilling and completion engineers can take lessons learned from MEMs to plan future operations that are more efficient and safer than they would be without this information. They can assess the consequences of geomechanical effects for various scenarios of oilfield operations as a function of the development plan or design parameters. Well engineers can conduct wellbore stability analyses to decide well orientation, casing architecture and drilling mud properties such as density. Stimulation engineers can select perforation intervals for hydraulic fracturing based on the stress profile along wellbores to improve reservoir contact and ensure fracture containment.

Workflows in accordance with embodiments of the present disclosure seamlessly integrate basin scale stress state, well test data, well logging data, well diagnostic data, lab test data, and wellbore drilling mud weight window data from pilot wells to construct an MEM for a field or basin. The compatibility and consistency of all the integrated data is achieved by a novel recursive calibration procedure.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method of operating a well testing system, comprising:

obtaining a density logging data set and a caliper logging data set using a well logging assembly disposed in a pilot hole extending from a surface location to a formation;

executing the following steps using a mechanical earth model (MEM) development system coupled to the well logging assembly and positioned at the surface location:

integrating the density logging data set to compute vertical stress;

applying one or more correlation models or equations to estimate a pore pressure and one or more mechanical properties;

calibrating the pore pressure with drill stem test data;

calibrating the one or more mechanical properties with one or more laboratory tests on a plurality of core plugs or on a plurality of rock cuttings;

estimating a minimum horizontal stress using one or more correlation models;

calibrating the minimum horizontal stress with one or more minifrac tests;

estimating a maximum horizontal stress using the one or more correlation models while assuming one or more correlation parameters;

calibrating the maximum horizontal stress with a global pattern of tectonic strains and a basin stress regime;

evaluating one or more breakout regions using the MEM, a trajectory of a well, and a geometry of a pilot hole; and comparing the one or more breakout regions and the caliper logging data set.

2. The method of claim 1, further comprising:

determining there is an inconsistency between the one or more breakout regions and the caliper logging data set;

re-estimating the maximum horizontal stress using the one or more correlation models while adjusting the one or more correlation parameters;

evaluating one or more breakout regions using the MEM, the trajectory of the well, and the geometry of the pilot hole; and checking a consistency between the one or more breakout regions and the caliper logging data set.

3. The method of claim 1, further comprising:

determining there is a consistency between the one or more breakout regions and the caliper logging data set;

evaluating one or more collapse mud weights in comparison to an operating mud weight using the MEM, the trajectory of the well, and the geometry of the pilot hole; and comparing a breakout region indicated by the one or more collapse mud weights and the operating mud weight and the one or more breakout regions indicated in the MEM.

4. The method of claim 3, further comprising:

determining there is an inconsistency between the breakout region indicated by the one or more collapse mud weights and the operating mud weight and the one or more breakout regions indicated in the MEM;

re-estimating the maximum horizontal stress using the one or more correlation models while adjusting the one or more correlation parameters;

evaluating the one or more breakout regions using the MEM, the trajectory of the well, and the geometry of the pilot hole; and checking a consistency between the one or more breakout regions and the caliper logging data set;

determining there is a consistency between the one or more breakout regions and the caliper logging data set;

evaluating the one or more collapse mud weights in comparison to the operating mud weight using the MEM, the trajectory of the well, and the geometry of the pilot hole; and comparing the breakout region indicated by the one or more collapse mud weights and the operating mud weight and the one or more breakout regions indicated in the MEM.

5. The method of claim 1, further comprising performing density logging, performing sonic logging, and performing caliper logging.

6. The method of claim 1, wherein estimating the minimum horizontal stress and estimating the maximum horizontal stress comprises using a poroelastic horizontal strain model.

7. The method of claim 2, further comprising computing one or more breakout angles from the maximum horizontal stress and the minimum horizontal stress at one or more total vertical depths and defining the one or more breakout regions based, at least in part, on the one or more breakout angles.

8. The method of claim 7, wherein determining there is an inconsistency between the one or more breakout regions and the caliper logging data set comprises:

plotting the one or more breakout angles, one or more breakout depths and a hole size;

observing that the caliper logging data set reports an absence of a breakout region;

observing that the one or more breakout angles are greater than zero; and determining that the maximum horizontal stress is overestimated.

9. The method of claim 8, further comprising:

adjusting one or more tectonic strains in a poroelastic horizontal stress model; and re-estimating the maximum horizontal stress.

10. The method of claim 1, further comprising calculating a safe mud weight window, wherein a lower bound of the safe mud weight window is a minimum mud weight required to prevent a borehole breakout and wherein an upper bound of the safe mud weight window is a maximum mud weight required to avoid borehole fracturing.

11. The method of claim 1, wherein the one or more mechanical properties are selected from a group consisting of Young's modulus, Poisson's ratio, unconfined compressive strength (UCS), frictional angle, and tensile strength.

12. A well testing system, comprising:

a pilot hole extending from a surface location to a formation;

a well logging assembly disposed in the pilot hole and configured to perform density logging, performing sonic logging, and performing caliper logging; and a mechanical earth model (MEM) development system coupled to the well logging assembly and positioned at the surface location, wherein the MEM development system is configured to:

integrate a density logging data set to compute vertical stress;

apply one or more correlation models or equations to estimate a pore pressure and one or more mechanical properties;

calibrate the pore pressure with drill stem test data;

calibrate the one or more mechanical properties with one or more laboratory tests on a plurality of core plugs or on a plurality of rock cuttings;

estimate a minimum horizontal stress using the one or more correlation models;

calibrate the minimum horizontal stress with one or more minifrac tests;

estimate a maximum horizontal stress using the one or more correlation models while assuming one or more correlation parameters;

calibrating the maximum horizontal stress with a global pattern of tectonic strains and a basin stress regime;

evaluate one or more breakout regions using the MEM, a trajectory of a well, and a geometry of a pilot hole; and compare the one or more breakout regions and a caliper logging data set.

13. The well testing system of claim 12, wherein the MEM development system comprises a computer processor and a memory.

14. The well testing system of claim 12, wherein the one or more mechanical properties are selected from a group consisting of Young's modulus, Poisson's ratio, unconfined compressive strength (UCS), frictional angle, and tensile strength.

15. The well testing system of claim 12, further comprising a rock analyzer coupled to the MEM development system, wherein the rock analyzer is configured to perform laboratory testing of a plurality of rock samples.

16. The well testing system of claim 15, wherein the rock analyzer is configured to calibrate the one or more mechanical properties estimated by the MEM development system.

17. The well testing system of claim 12, wherein the MEM development system is further configured to:

determining there is an inconsistency between the one or more breakout regions and the caliper logging data set;

re-estimating the maximum horizontal stress using one or more correlation models while assuming one or more correlation parameters;

evaluating one or more breakout regions using the MEM, the trajectory of the well, and the geometry of the pilot hole; and checking a consistency between the one or more breakout regions and the caliper logging data set.

18. The well testing system of claim 12, wherein the MEM development system is further configured to:

determine there is a consistency between the one or more breakout regions and the caliper logging data set;

evaluate one or more collapse mud weights in comparison to an operating mud weight using the MEM, the trajectory of the well, and the geometry of the pilot hole; and compare a breakout region indicated by the one or more collapse mud weights and the operating mud weight and the one or more breakout regions indicated in the MEM.

19. The well testing system of claim 18, wherein the MEM development system is further configured to:

determine there is an inconsistency between the breakout region indicated by the one or more collapse mud weights and the operating mud weight and the one or more breakout regions indicated in the MEM;

re-estimate the maximum horizontal stress using the one or more correlation models while assuming one or more correlation parameters;

evaluate one or more breakout regions using the MEM, the trajectory of the well, and the geometry of the pilot hole; and check a consistency between the one or more breakout regions and the caliper logging data set;

determine there is a consistency between the one or more breakout regions and the caliper logging data set;

evaluate the one or more collapse mud weights in comparison to the operating mud weight using the MEM, the trajectory of the well, and the geometry of the pilot hole; and compare the breakout region indicated by the one or more collapse mud weights and the operating mud weight and the one or more breakout regions indicated in the MEM.

20. The well testing system of claim 12, wherein the MEM development system is further configured to:

calculate a safe mud weight window, wherein a lower bound of the safe mud weight window is a minimum mud weight required to prevent a borehole breakout and wherein an upper bound of the safe mud weight window is a maximum mud weight required to avoid borehole fracturing.

* * * * *